United States Patent
Schmidt et al.

(10) Patent No.: US 6,762,299 B2
(45) Date of Patent: Jul. 13, 2004

(54) MIXED CRYSTALS OF BENZIMIDAZOLONEDIOXAZINE COMPOUNDS

(75) Inventors: Martin U. Schmidt, Frankfurt am Main (DE); Peter Kempter, Bad Soden (DE); Carsten Plueg, Weil am Rhein/Haltingen (DE); Roland Born, Village-Neuf (DE)

(73) Assignee: Clariant GmbH, Frankfurt (DE)

( * ) Notice: Subject to any disclaimer, the term of this patent is extended or adjusted under 35 U.S.C. 154(b) by 107 days.

(21) Appl. No.: 10/001,777

(22) Filed: Oct. 24, 2001

(65) Prior Publication Data

US 2002/0091258 A1 Jul. 11, 2002

(30) Foreign Application Priority Data

Oct. 24, 2000 (DE) .......................... 100 52 858

(51) Int. Cl.[7] .......................................... C07D 498/22
(52) U.S. Cl. ........................................................ 544/74
(58) Field of Search .......................................... 544/74

(56) References Cited

U.S. PATENT DOCUMENTS

| | | | |
|---|---|---|---|
| 3,929,719 A | 12/1975 | Pugin et al. | 260/40 |
| 4,986,852 A | 1/1991 | Dietz et al. | 106/498 |
| 5,035,747 A | 7/1991 | Dietz et al. | 106/495 |
| 5,565,563 A | 10/1996 | Kaul et al. | 544/74 |
| 5,708,188 A | 1/1998 | Hao et al. | 548/453 |
| 6,162,261 A | 12/2000 | Kempter et al. | 544/74 |

FOREIGN PATENT DOCUMENTS

| | | |
|---|---|---|
| DE | 44 42 291 | 6/1995 |
| DE | 197 27 079 | 1/1999 |
| EP | 0 321 919 | 6/1989 |
| EP | 0 704 497 | 4/1996 |
| EP | 0 889 046 | 1/1999 |
| EP | 0 911 337 | 4/1999 |
| GB | 2 284 427 | 6/1995 |

*Primary Examiner*—Richard L. Raymond
(74) *Attorney, Agent, or Firm*—Anthony A. Bisulca

(57) ABSTRACT

A mixed crystal of two or more different benzimidazolonedioxazine compounds of the formula (1)

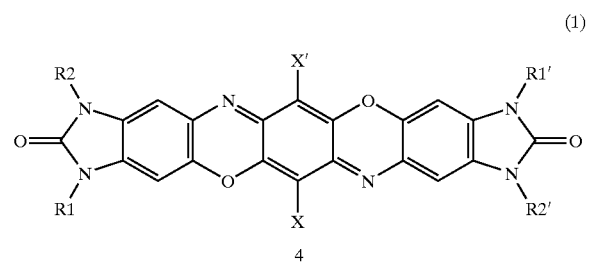

where

X and X' are identical or different and are hydrogen or halogen, R1, R1', R2 and R2' are identical or different and are hydrogen, $C_1$–$C_{18}$ alkyl, trifluoromethyl, $C_1$–$C_{18}$ alkylcarbonyl, $C_5$–$C_6$ cycloalkyl or phenyl which may be unsubstituted or substituted by one or more halogen atoms, nitro groups, trifluoromethyl, $C_1$–$C_{18}$ alkyl, $C_1$–$C_{18}$ alkoxy, $C_1$–$C_{18}$ alkylcarbonyl and/or $C_1$–$C_{18}$ alkoxycarbonyl groups.

The mixed crystals are of low solubility and feature good fastness properties and red to blue colorations.

The mixed crystals are suitable for pigmenting paints, plastics, printing inks, aqueous or solvent-based pigment preparations, electrophotographic toners and developers, powder coating materials, inks, preferably inkjet inks, color filters, and for coloring seed and cosmetics.

17 Claims, No Drawings

MIXED CRYSTALS OF BENZIMIDAZOLONEDIOXAZINE COMPOUNDS

BACKGROUND OF THE INVENTION

The present invention is situated in the field of dioxazine pigments, especially the benzimidazolonedioxazines.

Benzimidazolonedioxazine pigments are described in DE-A-44 42 291, EP-A-0 911 337, DE-A-197 27 079, and GB-A-22 84 427, and feature shades of red to blue.

SUMMARY OF THE INVENTION

It is an object of the present invention to provide dioxazine pigments having high color strengths, good dispersibility, good light stability, and good weather fastness. A further object is to provide dioxazine pigments with a particularly red hue.

It has been found that mixed crystals of different compounds of the formula (1) below surprisingly achieve these objects.

DESCRIPTION OF THE PREFERRED EMBODIMENTS

The invention provides mixed crystals comprising two or more, preferably 2, 3 or 4, different benzimidazolonedioxazine compounds of the formula (1)

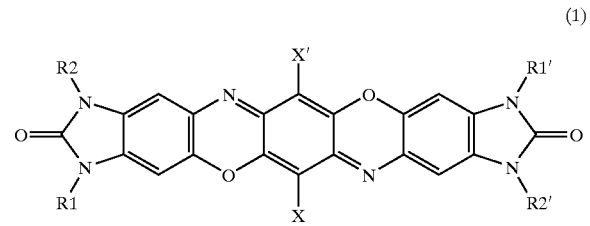

(1)

where

X and X' are identical or different and are hydrogen or halogen, R1, R1', R2 and R2' are identical or different and are hydrogen, $C_1$–$C_{18}$ alkyl, trifluoromethyl, $C_1$–$C_{18}$ alkylcarbonyl, $C_5$–$C_6$ cycloalkyl or phenyl which may be unsubstituted or substituted by one or more, e.g., 1, 2, 3 or 4, halogen atoms, nitro groups, trifluoromethyl, $C_1$–$C_{18}$ alkyl, $C_1$–$C_{18}$ alkoxy, $C_1$–$C_{18}$ alkylcarbonyl and/or $C_1$–$C_{18}$ alkoxycarbonyl groups.

In the solid state, the compound of the formula (1) may also exist in another tautomeric, isomeric, or tautomeric isomeric form.

For the purposes of the present invention, the term mixed crystals also embraces solid solutions. The properties of the mixed crystals differ both from the properties of the individual components and from the properties of physical mixtures of the individual components. In particular, the X-ray powder diffraction patterns of the mixed crystals differ from the sum of the powder diffraction patterns of the individual compounds.

The fractions of the individual components in the mixed crystals of the invention amount to between 1 and 99 mol % for each individual component, preferably between 10 and 90 mol %, in particular between 20 and 60 mol %.

Preferred binary mixed crystals consist of two different compounds of the formula (1) in a molar ratio of from 1:9 to 9:1, preferably from 1:3 to 3:1.

Preferred ternary mixed crystals consist of three different compounds of the formula (1) in a molar ratio q:r:s, q and r being situated independently of one another within a range from 1 to 10, preferably from 3 to 7, and s in the range from 0.1 to 100, preferably from 1 to 50.

Preferred compounds of the formula (1) are those wherein X and X' are hydrogen, fluorine, chlorine or bromine.

Further preferred compounds of the formula (1) are those wherein R1, R1', R2 and R2' are hydrogen, $C_1$–$C_4$ alkyl, especially methyl, ethyl and propyl, trifluoromethyl, $C_1$–$C_4$ alkylcarbonyl, cyclohexyl or phenyl which is unsubstituted or substituted by 1, 2 or 3 radicals selected from the group consisting of fluorine, chlorine, bromine, nitro, methyl, ethyl, propyl, methoxy, ethoxy, methylcarbonyl, methoxycarbonyl and/or ethoxycarbonyl.

Particularly preferred compounds of the formula (1) are those wherein X=X'=Cl, R2=R2'=H, and R1 and R1' independently of one another are methyl or ethyl.

Examples of benzimidazolone compounds of the formula (1) that form preferred mixed crystals are the compounds of the following formulae:

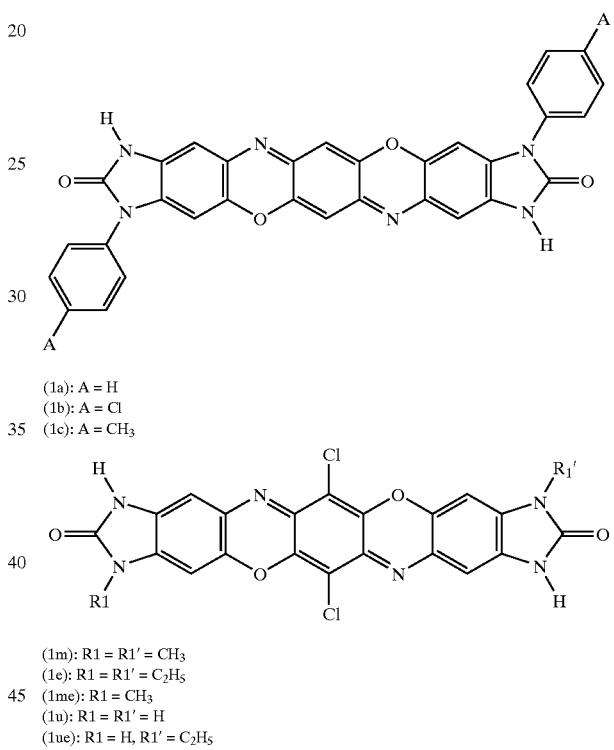

(1a): A = H
(1b): A = Cl
(1c): A = $CH_3$ (1m): R1 = R1' = $CH_3$
(1e): R1 = R1' = $C_2H_5$
(1me): R1 = $CH_3$
(1u): R1 = R1' = H
(1ue): R1 = H, R1' = $C_2H_5$

Preferred binary mixed crystals are those wherein one component is a compound of the formula (1a), (1b), (1c), (1m), (1e), (1me), (1u) or (1ue) and the second component is another compound selected from these formulae.

Preferred ternary mixed crystals are those wherein one component is a compound of the formula (1a), (1b), (1c), (1m), (1e), (1me), (1u) or (1ue) and the two other components are each another compound selected from these formulae.

Particularly preferred binary mixed crystals are those of the compounds of the formulae (1m) and (1e), particularly in a molar ratio of from 1:9 to 9:1, in particular from 1:3 to 3:1.

Particularly preferred ternary mixed crystals are those of the compounds of the formulae (1m), (1e) and (1me). Preferably, the molar ratio between (1m) and (1e) is between 1:10 and 10:1, in particular between 1:3 and 3:1, and the molar ratio of (1me) to the sum of the molar fractions of (1e) and (1m) is between 1:10 and 10:1, in particular between 1:3 and 3:1.

The mixed crystals of the invention feature red to blue hues, high color strengths, good dispersibilities, good light stabilities, and good weather fastness properties, and in particular feature unexpected hues. For example, in alkyd-melamine varnish, a ternary mixed crystal of the components (1m), (1e) and (1me) is not only markedly redder than a physical mixture of the three individual components (1m), (1e) and (1me) but is also markedly redder than each of the individual components (1m), (1e) and (1me) prepared under the same conditions, despite the fact that (1m) is reddish violet whereas (1e) is bluish violet. This illustrates the great influence which the formation of a mixed crystal has on the properties of these pigments.

The mixed crystals of the invention may be prepared, for example, by cosynthesis or by conjoint recrystallization of the different individual compounds.

The invention also provides a process for preparing the mixed crystals of the invention which comprises reacting a mixture of two or more different compounds of the formula (2)

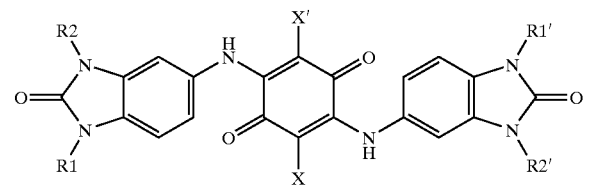

(2)

with sulfuric acid in the presence of an oxidizing agent or reacting a mixture of two or more different compounds of the formula (3)

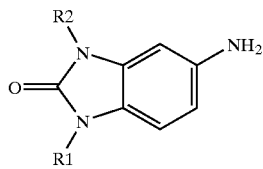

(3)

with chloranil and reacting the reaction product with sulfuric acid in the presence of an oxidizing agent. The reaction with sulfuric acid may take place at temperatures between −10° C. and +50° C., preferably between 0 and 30° C. The amount of manganese dioxide may be from 2 to 4 mol per mole of the compound of the formula (2).

Binary mixed crystals are obtained, for example, by reacting a mixture of two different compounds of the formula (2) with an oxidizing agent, such as manganese dioxide, in sulfuric acid, as described above.

Ternary mixed crystals are obtained, for example, by reacting a mixture of two different compounds of the formula (3) with chloranil and reacting the resultant mixture of three different compounds of the formula (2) with an oxidizing agent, such as manganese dioxide, in sulfuric acid.

Examples of suitable solvents for the reaction with chloranil include ethanol, o-dichlorobenzene, dimethylformamide, dimethylacetamide, and N-methylpyrrolidone. The reaction may take place at temperatures from 0 to 250° C., preferably from 20 to 210° C. The molar amount of chloranil in relation to the sum of the compounds of the formula (3) is appropriately from 0.4 to 0.6:1.

Mixed crystals may also be prepared by dissolving a mixture of two or more, in particular two or three, different compounds of the formula (1) in sulfuric acid, dichloroacetic acid and/or trifluoroacetic acid and adding the solution to water or acetic acid, and thereby precipitating the pigment in the form of a mixed crystal. In the case of trifluoroacetic acid, it is also possible to evaporate the acid and thereby precipitate the pigment in the form of a mixed crystal.

Additionally, it is also possible to prepare mixed crystals by conjoint sublimation of two or more, particularly two or three, different benzimidazolonedioxazines of the formula (1).

The mixed crystals of the invention may be present in different polymorphic forms. For example, the cosynthesis of (1m), (1e) and (1me) gives a ternary mixed crystal (1m/1e/1me) in the α phase which on treatment with certain solvents is transformed into another ternary mixed crystal with the same composition but a different crystal structure (β phase).

Three different polymorphs of a mixed crystal (1a/1b) are obtained, for example, when a mixture of (1a) and (1b) is recrystallized, depending on whether recrystallization takes place from sulfuric acid/water or trifluoroacetic acid/water or whether the mixture is precipitated from trifluoroacetic acid by evaporation.

The nature of the crystal polymorph is determined by X-ray powder diffractometry.

Depending on the purity of the reactants, the concentrations, the temperatures and temperature programs employed, the course of the synthesis over time, and any aftertreatment, on the pressure, the presence of impurities or additives, and the presence of seed crystals, it is possible alternatively for only mixed crystals of a single phase, or mixed crystals of different phases, or a mixture of mixed crystals and one or more pure compounds to be formed.

Depending on the desired field of application, it may be sensible to subject the resulting pigment to mechanical fine division. The fine division may be carried out by wet or dry grinding or by kneading. Grinding and/or kneading may be followed by treatment with a solvent, with water, or with a solvent/water mixture.

To facilitate the formation of mixed crystals, to stabilize the mixed crystals, to enhance the coloristic properties, and to achieve particular coloristic effects it is possible at any point in the process to add pigment dispersants, surface-active agents, defoamers, extenders or other additives. It is also possible to use mixtures of these additives. The additives may be added all at once or in two or more portions. The additives may be added at any point in the synthesis or in the various aftertreatments, or following the aftertreatments. The point in time that is best suited must be decided beforehand by means of rangefinding tests.

The mixed crystals of the invention, or a mixture comprising these mixed crystals, are suitable for pigmenting paints and plastics and for producing printing inks and pigment preparations.

The mixed crystals of the invention, or a mixture comprising these mixed crystals, are suitable for use as colorants in electrophotographic toners and developers, such as one- or two-component powder toners (also called one- or two-component developers), magnetic toners, liquid toners, latex toners, addition-polymerization toners, and specialty toners, for example.

Typical toner binders are addition-polymerization, polyaddition, and polycondensation resins, such as styrene, styrene acrylate, styrene butadiene, acrylate, polyester, and phenol-epoxy resins, polysulfones, polyurethanes, individually or in combination, and also polyethylene and polypropylene, which may contain further ingredients, such as charge control agents, waxes or flow aids, or may be subsequently modified with these additives.

Moreover, the mixed crystals of the invention, or a mixture comprising these mixed crystals, are suitable for use as colorants in powders and powder coating materials, especially in triboelectrically or electrokinetically sprayable powder coating materials that are used to coat the surfaces of articles comprising, for example, metal, wood, plastic, glass, ceramic, concrete, textile material, paper or rubber.

Powder coating resins that are employed typically comprise epoxy resins, carboxyl- and hydroxyl-containing polyester resins, polyurethane resins, and acrylic resins, together with customary curing agents. Resin combinations are also employed. For example, epoxy resins are frequently used in combination with carboxyl- and hydroxyl-containing polyester resins. Examples of typical curing components (depending on the resin system) include acid anhydrides, imidazoles, and also dicyandiamide and its derivatives, blocked isocyanates, bisacylurethanes, phenolic resins, and melamine resins, triglycidyl isocyanurates, oxazolines, and dicarboxylic acids.

Furthermore, the mixed crystals of the invention, or a mixture comprising these mixed crystals, are suitable for use as colorants in inks, preferably inkjet inks, such as those on an aqueous or a nonaqueous basis, for example; in microemulsion inks; and in those inks which operate in accordance with the hot-melt process.

Inkjet inks generally contain a total of from 0.5 to 15% by weight, preferably from 1.5 to 8% by weight, calculated on a dry basis, of one or more of the compounds of the invention.

Microemulsion inks are based on organic solvents, water and, if desired, an additional hydrotropic substance (interface mediator). Microemulsion inks contain from 0.5 to 15% by weight, preferably from 1.5 to 8% by weight, of one or more of the compounds of the invention, from 5 to 99% by weight of water, and from 0.5 to 94.5% by weight of organic solvent and/or hydrotropic compound.

Solvent-based inkjet inks contain preferably from 0.5 to 15% by weight of one or more compounds of the invention and from 85 to 99.5% by weight of organic solvent and/or hydrotropic compounds.

Hot-melt inks are based generally on waxes, fatty acids, fatty alcohols or sulfonamides which are solid at room temperature and liquefy on heating, the preferred melting range being between about 60 and about 140° C. Hot-melt inkjet inks consist substantially, for example, of from 20 to 90% by weight of wax and from 1 to 10% by weight of one or more of the compounds of the invention. It is also possible for from 0 to 20% by weight of an additional polymer (as "dye dissolver"), from 0 to 5% by weight of dispersing aids, from 0 to 20% by weight of viscosity modifiers, from 0 to 20% by weight of plasticizers, from 0 to 10% by weight of tack additive, from 0 to 10% by weight of transparency stabilizer (which prevents, for example, crystallization of the waxes), and from 0 to 2% by weight of antioxidant to be present. Typical additives and auxiliaries are described, for example, in U.S. Pat. No. 5,560,760.

In addition, the mixed crystals of the invention, or a mixture comprising these mixed crystals, are also suitable for use as colorants for color filters, both for additive and for subtractive color generation, and for "electronic inks".

Moreover, the mixed crystals of the invention, or a mixture comprising these mixed crystals, are also suitable for use in coloring cosmetics, for coloring paper in the mass, and for textile printing.

EXAMPLES

In the examples below, parts and percentages are by weight. Evidence of the mixed crystals and of the nature of the polymorph of the mixed crystals is provided by X-ray powder diffractometry (Cu—$K_\alpha$ radiation, twice the Bragg angle 2Θ in degrees, the intensities in brackets). Line positions characterized as being "broad" are given to an accuracy of ±0.4°, all other line positions to an accuracy of ±0.2°.

Example 1

Cosynthesis of (1m) and (1e)

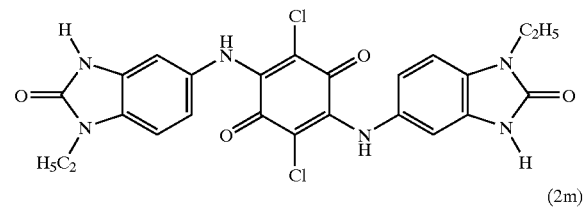

(2e)

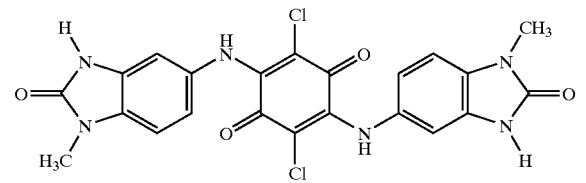

(2m)

A mixture of 79.2 parts of the compound (2e) and 75.3 parts of the compound (2m) is incorporated by stirring at a temperature of from 5 to 15° C. into 2760 parts of concentrated sulfuric acid. Stirring is continued at from 5 to 15° C. for 15 minutes more and then 72 parts of activated manganese dioxide are added over the course of 5 hours, the temperature being maintained at from 5 to 15° C. The excess $MnO_2$ is destroyed by adding 15 parts of 35% $H_2O_2$ solution. Stirring is continued at from 5 to 15° C. for 3 hours and then water is added in an amount such that the sulfuric acid has a concentration of 80%. The precipitate is filtered off, washed with sulfuric acid and water, and dried. This gives a binary mixed crystal of the compounds (1m) and (1e) which shows the following lines in the X-ray powder diffraction pattern (α' phase):

5.23 (weak), 6.30 (weak), 9.32 (moderate), 11.95 (weak, broad), 19.93 (very weak, broad), 26.78 (strong).

Example 2

Cosynthesis of (1m), (1e) and (1me)

A mixture of 65.2 parts of 5-amino-1-methyl-1,3-dihydrobenzimidazol-2-one (3m) and 70.8 parts of 5-amino-1-ethyl-1,3-dihydrobenzimidazol-2-one (3e) is added to a mixture of 750 parts of dimethylacetamide and 65.6 parts of sodium hydrogencarbonate. The reaction mixture is heated to 80° C. and 98.8 parts of chloranil are added over the course of four and a half hours. After the end of the reaction, the mixture is heated at boiling for one hour. The precipitate is filtered off hot, washed and dried. The mixture of compounds of the formula (2) thus synthesized is cyclized, as described by Example 1, using sulfuric acid/$MnO_2$. This gives a ternary mixed crystal of the compounds (1m), (1e) and (1me) which shows the following lines in the X-ray powder diffraction pattern (α phase):

5.03 (moderate-weak), 6.11 (weak, broad), 10.02 (moderate-strong), 11.21 (very weak, broad), 20.74 (very weak, broad), 26.63 (strong).

Example 3

Phase Conversion of a Binary Mixed Crystal of (1m) and (1e)

1 part of the binary mixed crystal from Example 1 is suspended in a mixture of 1.5 parts of water and 8.5 parts of isobutanol and the suspension is heated at reflux for 5 hours and filtered, and the solid product is washed and dried. This gives a new crystal polymorph of the binary mixed crystal of the compounds (1m) and (1e) which shows the following lines in the X-ray powder diffraction pattern (β' phase):

5.09 (weak), 6.36 (moderate), 10.78 (moderate-strong), 12.07 (weak, broad), 14.17 (moderate-weak), 19.37 (weak), 20.75 (weak), 21.69 (weak), 23.07 (weak), 24.88 (weak), 25.97 (moderate), 26.94 (strong), 28.09 (very weak).

Example 4

Phase Conversion of a Ternary Mixed Crystal of (1m), (1e) and (1me)

1 part of the ternary mixed crystal from Example 2 is suspended in 10 parts of N-methylpyrrolidone and the suspension is heated at 130° C. for 3 hours and filtered, and the soild product is washed and dried.

This gives a new crystal polymorph of the ternary mixed crystal of the compounds (1m), (1e) and (1me) which shows the following lines in the X-ray powder diffraction pattern (β phase):

6.37 (moderate), 10.78 (moderate), 10.90 (moderate-strong), 13.91 (weak), 14.39 (moderate-weak), 19.48 (moderate-weak), 20.71 (weak), 21.82 (weak), 23.07 (weak), 24.74 (very weak), 25.92 (moderate-weak), 27.05 (strong), 28.15 (very weak), 28.99 (weak).

Example 5

Phase Conversion of a Ternary Mixed Crystal of (1m), (1e) and (1me)

1 part of the ternary mixed crystal from Example 2 is suspended in a mixture of 1.5 parts of water and 8.5 parts of isobutanol, the suspension is boiled at reflux for 5 hours and filtered, and the solid product is washed and dried. This gives a ternary mixed crystal of the compounds (1m), (1e) and (1me). As the X-ray powder diffraction pattern shows, the mixed crystal has the same polymorphic form as in Example 4.

Example 6

Cosynthesis of (1m), (1e) and (1me)

The procedure of Example 2 is repeated except that a mixture of 13 parts of the compound (3m) and 127.4 parts of the compound (3e) is used. 1 part of the powder thus prepared is suspended in a mixture of 1.5 parts of water and 8.5 parts of isobutanol, the suspension is boiled at reflux for 5 hours and filtered, and the solid product is washed and dried. This gives a ternary mixed crystal of the compounds (1m), (1e) and (1me) which shows the following lines in the X-ray powder diffraction pattern:

7.51 (moderate), 9.79 (strong), 10.78 (moderate-weak), 13.13 (weak), 13.79 (moderate), 15.97 (moderate-weak), 19.32 (moderate), 20.08 (very weak), 21.65 (moderate), 22.76 (moderate-weak, broad), 24.45 (moderate-weak), 26.17 (moderate), 26.67 (strong), 28.26 (moderate-weak).

Example 7

Cosynthesis of (1m), (1e) and (1me)

The procedure of Example 2 is repeated except that a mixture of 117.4 parts of the compound (3m) and 14.2 parts of the compound (3e) is used. 1 part of the powder thus prepared is suspended in a mixture of 1.5 parts of water and 8.5 parts of isobutanol, the suspension is boiled at reflux for 5 hours and filtered, and the solid product is washed and dried. This gives a ternary mixed crystal of the compounds (1m), (1e) and (1me) which shows the following lines in the X-ray powder diffraction pattern:

5.04 (weak), 6.34 (moderate-weak), 10.91 (moderate-weak), 12.30 (moderate), 14.32 (weak, broad), 16.80 (very weak, broad), 19.91 (very weak, broad), 23.42 (very weak, broad), 25.10 (very weak, broad), 26.98 (strong), 31.93 (very weak, broad).

Example 8

Cosynthesis of (1u), (1e) and (1ue)

The procedure of Example 2 is repeated but using a mixture of 70.8 parts of the compound (3e) and 59.6 parts of 5-amino-1,3-dihydrobenzimidazol-2-one (3u). This gives a ternary mixed crystal of the compounds (1e), (1u) and (1ue) which shows the following lines in the X-ray powder diffraction pattern: 6.56 (moderate), 10.10 (strong), 13.28 (moderate), 20.14 (weak, broad), 22.66 (weak), 26.50 (moderate-strong), 27.16 (strong).

Example 9

Recrystallization of (1m) and (1e) from Sulfuric Acid/Water

1.75 parts of pigment of the formula (1m) and 1.75 parts of the pigment of the formula (1e) are dissolved in 92 parts of sulfuric acid and this solution is added at room temperature to 400 parts of water. The mixture is heated at boiling for 5 minutes and the precipitate is filtered off, washed and dried. This gives a mixture of two binary mixed crystals each consisting of (1m) and (1e) and corresponding to the mixed crystals of Examples 1 and 3.

Example 10

Recrystallization of (1m) and (1e) in Sulfuric Acid/Glacial Acetic Acid

The procedure of the preceding example is repeated but using acetic acid instead of water. This gives a mixture of two binary mixed crystals each consisting of (1m) and (1e) and corresponding to the mixed crystals from Examples 1 and 3.

Example 11

Recrystallization of (1a) and (1b) in Sulfuric Acid/Water

A mixture of 0.25 part of pigment of the formula (1a) and 0.25 part of the pigment of the formula (1b) and also 36.4 parts of sulfuric acid is heated to 100° C. 29 parts of water are added over the course of 10 minutes. After the mixture has cooled to room temperature, the precipitate is filtered off, washed and dried. This gives a binary mixed crystal of (1a) and (1b) which shows the following lines in the X-ray powder diffraction pattern: 6.76 (strong), 11.63 (weak), 12.73 (weak), 13.18 (weak), 13.56 (weak), 16.45 (weak), 16.94 (weak), 17.20 (weak), 17.87 (weak), 23.26 (weak), 24.09 (very weak), 25.57 (moderate-weak), 26.56 (moderate), 27.13 (moderate, broad).

Example 12

Recrystallization of (1a) and (1c) from Sulfuric Acid/Water

The procedure of the proceeding example is repeated but using 0.375 part of the pigment of the formula (1a) and 0.125 part of pigment of the formula (1c). This gives a binary mixed crystal of (1a) and (1c) which shows the following lines in the X-ray powder diffraction pattern: 6.68 (strong), 12.70 (weak), 13.13 (weak), 13.53 (weak), 16.41 (weak), 17.12 (weak), 17.83 (very weak), 25.54 (weak), 26.57 (moderate), 27.10 (moderate, broad).

Example 13

Recrystallization of (1a) and (1b) from Trifluoroacetic Acid/Water

A mixture of 1 part of pigment of the formula (1a) and 1 part of pigment of the formula (1b) is dissolved in 148 parts of trifluoroacetic acid. 100 parts of water are added and the mixture is heated to boiling. The precipitate is filtered off, washed and dried. This gives a binary mixed crystal of (1a) and (1b) which shows the following lines in the X-ray powder diffraction pattern: 7.52 (strong), 12.43 (weak), 13.66 (weak, broad), 15.08 (weak, broad), 19.65 (very weak, broad), 20.54 (weak, broad), 22.96 (weak, broad), 26.87 (strong), 29.19 (weak, broad). The mixed crystal is not isotypic with the other two mixed crystals prepared from (1a) and (1b), from Examples 11 and 14.

Example 14

Recrystallization of (1a) and (1b) in Trifluoroacetic acid

A mixture of 0.5 part of pigment of the formula (1a) and 0.5 part of the pigment of the formula (1b) is dissolved in 104 parts of trifluoroacetic acid. The trifluoroacetic acid is evaporated at room temperature to give a binary mixed crystal of (1a) and (1b) which is not isotypic with the two other mixed crystals prepared from (1a) and (1b), from Examples 11 and 13. The X-ray powder diffraction pattern shows the following lines: 6.43 (strong), 7.70 (moderate-weak), 9.29 (moderate-weak), 11.97 (moderate-weak), 13.89 (weak), 16.19 (moderate), 16.79 (moderate-strong), 17.53 (weak), 18.05 (moderate-weak), 23.09 (weak), 23.85 (moderate-weak), 25.88 (moderate-strong), 26.68 (moderate-strong), 27.63 (moderate-weak).

Example 15

Sublimation of (1m) and (1e)

1.75 parts of pigment of the formula (1m) and 1.75 parts of the pigment of the formula (1e) are mixed and the mixture is sublimed in a tube furnace under a pressure of 0.1 Pa and at a temperature of 450° C. This gives a binary mixed crystal of (1m) and (1e) which features the following lines in the X-ray powder diffraction pattern: 10.39 (strong), 13.30 (moderate), 22.83 (weak), 26.75 (moderate), 31.07 (very weak).

What is claimed is:

1. A mixed crystal of two or more different benzimidazolonedioxazine compounds of the formula (1)

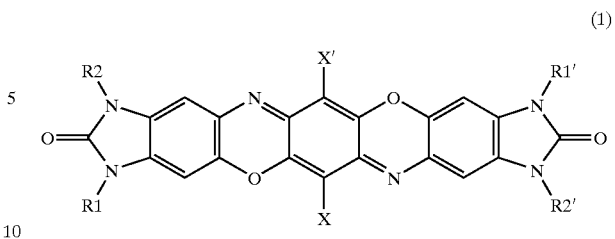

where
X and X' are identical or different and are hydrogen or halogen, R1, R1', R2 and R2' are identical or different and are hydrogen, $C_1$–$C_{18}$ alkyl, trifluoromethyl, $C_1$–$C_{18}$ alkylcarbonyl, $C_5$–$C_6$ cycloalkyl or phenyl which may be unsubstituted or substituted by one or more halogen atoms, nitro groups, trifluoromethyl, $C_1$–$C_{18}$ alkyl, $C_1$–$C_{18}$ alkoxy, $C_1$–$C_{18}$ alkylcarbonyl and/or $C_1$–$C_{18}$ alkoxycarbonyl groups.

2. The mixed crystal as claimed in claim 1, wherein each of the different compounds of the formula (1) may be present in the mixed crystal at from 1 to 99 mol %.

3. The mixed crystal as claimed in claim 1, wherein X and X' are hydrogen, fluorine, chlorine or bromine.

4. The mixed crystal as claimed in claim 1, wherein R1, R1', R2 and R2' are hydrogen, $C_1$–$C_4$ alkyl, especially methyl, ethyl and propyl, trifluoromethyl, $C_1$–$C_4$ alkylcarbonyl, cyclohexyl or phenyl which is unsubstituted or substituted by 1, 2 or 3 radicals from the group consisting of fluorine, chlorine, bromine, nitro, methyl, ethyl, propyl, methoxy, ethoxy, methylcarbonyl, methoxycarbonyl and ethoxycarbonyl.

5. The mixed crystal as claimed in claim 1, wherein X=X'=Cl, R2=R2'=H, and R1 and R1' independently of one another are methyl or ethyl.

6. The mixed crystal as claimed in claim 1, consisting of two different compounds of the formula (1) in a molar ratio of from 1:9 to 9:1, preferably from 1:3 to 3:1.

7. The mixed crystal as claimed in claim 1, consisting of the compounds of the formula (1m) and (1e), preferably in a molar ratio of from 1:9 to 9:1

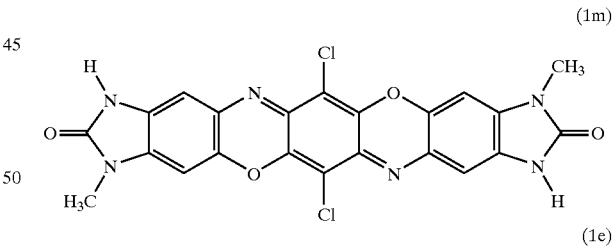

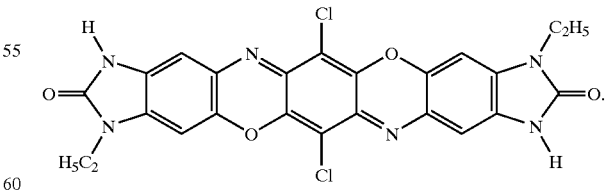

8. The mixed crystal as claimed in claim 7, characterized by the following lines in the X-ray powder diffraction pattern (Cu—$K_\alpha$ radiation, twice the Bragg angle 2Θ in degrees, the intensities in brackets): 5.09 (weak), 6.36 (moderate), 10.78 (moderate-strong), 12.07 (weak, broad), 14.17 (moderate-weak), 19.37 (weak), 20.75 (weak), 21.69

(weak), 23.07 (weak), 24.88 (weak), 25.97 (moderate), 26.94 (strong), 28.09 (very weak).

9. The mixed crystal as claimed in claim 1, consisting of three different compounds of the formula (1) in a molar ratio q:r:s, q and r independently of one another being situated within a range from 1 to 10, preferably from 3 to 7, and s in the range from 0.1 to 100, preferably from 1 to 50.

10. The mixed crystal as claimed in claim 1, consisting of the compounds (1m), (1e) and (1me)

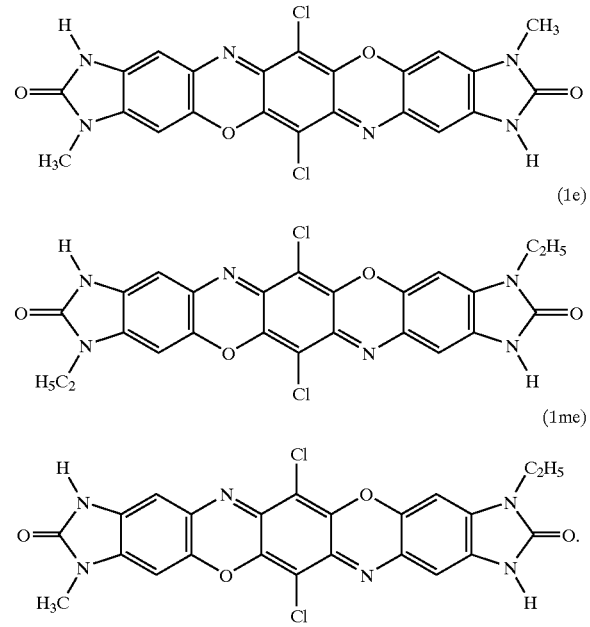

11. The mixed crystal as claimed in claim 10, wherein the molar ratio between the compounds of the formulae (1m) and (1e) is between 1:10 and 10:1, in particular between 1:3 and 3:1, and the molar ratio of (1me) to the sum of the molar fractions of (1e) and (1m) is between 1:10 and 10:1, in particular between 1:3 and 3:1.

12. The mixed crystal as claimed in claim 10, characterized by the following lines in the X-ray powder diffraction pattern (Cu—$K_\alpha$ radiation, twice the Bragg angle 2Θ in degrees, the intensities in brackets): 6.37 (moderate), 10.78 (moderate), 10.90 (moderate-strong), 13.91 (weak), 14.39 (moderate-weak), 19.48 (moderate-weak), 20.71 (weak), 21.82 (weak), 23.07 (weak), 24.74 (very weak), 25.92 (moderate-weak), 27.05 (strong), 28.15 (very weak), 28.99 (weak).

13. A process for preparing a mixed crystal as claimed in claim 1, which comprises reacting a mixture of two or more different compounds of the formula (2)

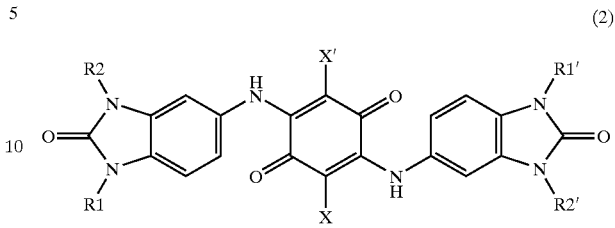

with sulfuric acid in the presence of an oxidizing agent, preferably manganese dioxide, and heating the product, where appropriate, with polar organic solvents at a temperature of between 40 and 250° C.

14. A process for preparing a mixed crystal as claimed in claim 1, which comprises reacting a mixture of two or more different compounds of the formula (3)

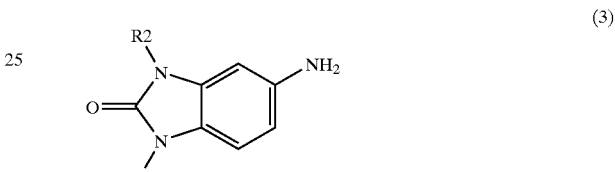

with chloranil, reacting the resulting mixture with sulfuric acid in the presence of an oxidizing agent, preferably manganese dioxide, and heating the product, where appropriate, with polar organic solvents at a temperature between 40 and 250° C.

15. The process as claimed in claim 13, wherein the polar organic solvent is a $C_1$–$C_{20}$ alcohol, preferably n-butanol or isobutanol, dimethylformamide or N-methylpyrrolidone.

16. A process for producing a mixed crystal as claimed in claim 1, which comprises dissolving a mixture of at least two different compounds of the formula (1) in sulfuric acid, dichloroacetic acid or trifluoroacetic acid and reprecipitating it with water or acetic acid.

17. A process for preparing a mixed crystal as claimed in claim 1, which comprises sublimating a mixture or two or more different compounds of the formula (1) together.

* * * * *